United States Patent [19]

Morishita et al.

[11] Patent Number: 4,856,323
[45] Date of Patent: Aug. 15, 1989

[54] STEERING TORQUE DETECTING DEVICE

[75] Inventors: Mitsuharu Morishita; Shinichi Kohge; Tadayuki Hara; Yasuaki Hata; Hisato Umemaru, all of Himeji, Japan

[73] Assignee: Mitsubishi Denki Kabushiki Kaisha, Tokyo, Japan

[21] Appl. No.: 260,276

[22] Filed: Oct. 20, 1988

Related U.S. Application Data

[62] Division of Ser. No. 177,085, Apr. 4, 1988.

[30] Foreign Application Priority Data

| Apr. 6, 1987 | [JP] | Japan | 62-52839 |
| Apr. 6, 1987 | [JP] | Japan | 62-52840 |
| Apr. 22, 1987 | [JP] | Japan | 62-61811 |
| Apr. 22, 1987 | [JP] | Japan | 62-61812 |

[51] Int. Cl.⁴ ............................................ G01M 19/00
[52] U.S. Cl. .................................. 73/118.1; 73/862.33
[58] Field of Search ................. 73/118.1, 862.33; 180/79.1; 74/388 PS; 310/248, 232

[56] References Cited

U.S. PATENT DOCUMENTS

| 3,772,005 | 11/1973 | deBarbadillo et al. | 420/38 X |
| 4,447,752 | 5/1984 | Boyce et al. | 310/232 |
| 4,635,741 | 1/1987 | Morishita et al. | 73/862.33 X |

Primary Examiner—Jerry W. Myracle
Attorney, Agent, or Firm—Oblon, Spivak, McClelland, Maier & Neustadt

[57] ABSTRACT

A steering torque detecting device comprises a steering shaft consisting of an input shaft and an output shaft, a torsion bar provided between the input shaft and the output shaft, a torque detecting unit for converting a quantity of torsion produced in the torsion bar into an electric output, an electricity collecting unit comprising slip rings and brushes which takes the electric output and supplies an electric power from an outer power source, bearings for supporting the input and output shaft on the same axial line, and a housing supporting the bearings, a printed wiring board in a circular plate form which is provided at its one surface with a resistance layer and an output electrode radially spaced apart from the resistance layer, the resistance layer and the output electrode constituting a potentiometer, and a slider having a portion extending in the radial direction of the circular printed wiring board so as to have contacting areas with a small width to the resistance layer and the output electrode.

1 Claim, 2 Drawing Sheets

STEERING TORQUE DETECTING DEVICE

This is a division, of application Ser. No. 177,085, filed Apr. 4, 1988.

BACKGROUND OF THE INVENTION

1. Field of the Invention

The present invention relates to a steering torque detecting device used for a motor-driven power steering system installed in, for instance, an automobile.

2. Discussion of the Background

There has been known a steering torque detecting device of such a type that a steering shaft is divided into an input shaft and an output shaft, a torsion bar is provided between the input and output shafts to connect them, displacement caused by a twisting force in the torsion bar is converted into displacement in stroke by means of a displacement converting means constituted by gears provided between the input and output shafts, and the displacement in stroke is detected by a stroke type potentiometer.

There has been known another type of detecting device which is so constructed that such displacement in the torsion bar is converted into a rotational displacement by means of a displacement converting means constituted by gears, and the rotational displacement is detected by a rotation type potentiometer. Thus, a quantity of torque detected is used to rotate a motor for steering operation so as to correspond to the detected quantity.

Thus, in the conventional steering torque detecting device utilizing the displacement converting means formed of the gears to convert the displacement in torsion into the displacement in stroke or the displacement in rotation, there is a disadvantage in that the entire structure is complicated and is large-sized.

SUMMARY OF THE INVENTION

It is an object of the present invention to provide a steering torque detecting device having a simple structure, and which is light weight and of a small size.

The foregoing and the other objects of the present invention have been attained by providing a steering torque detecting device which comprises a steering shaft consisting of an input shaft and an output shaft, a torsion bar for connecting the input shaft with the output shaft, a printed wiring board in a circular plate form which is provided at its one surface with a resistance layer and an output electrode radially spaced apart from the resistance layer, the resistance layer and the output electrode constituting a potentiometer, and which is attached to either the input shaft or the output shaft, a plurality of slip rings which are fixed to either shaft and are connected to electrodes formed at both ends of the resistance layer and the output electrodes, a plurality of brushes in contact with the slip rings to receive detection signals, and a slider mounted on the other shaft and having a portion extending in the radial direction of the circular printed wiring board so as to have contacting areas with a small width to the resistance layer and the output electrode.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
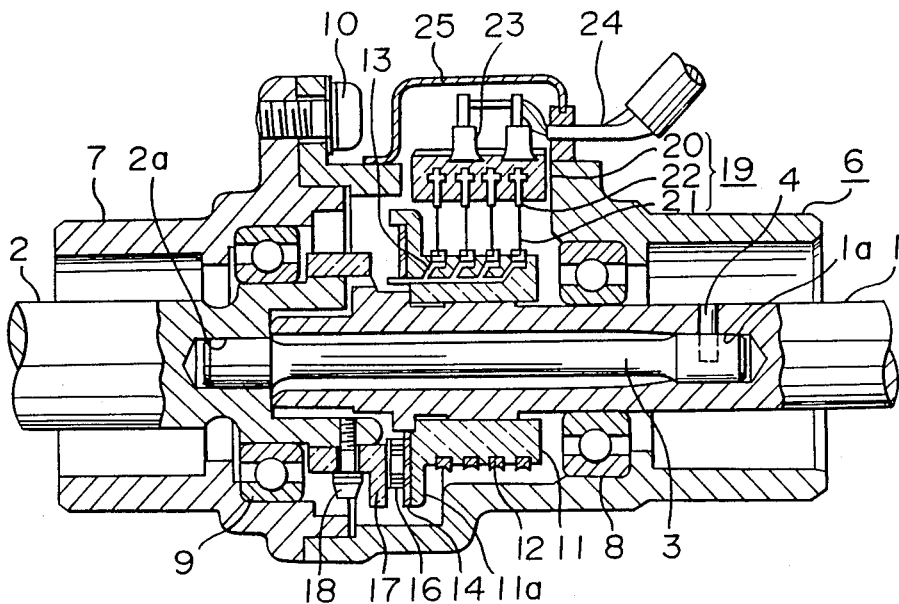
FIG. 1 is a longitudinal cross-sectional view of an embodiment of the steering torque detecting device according to the present invention.

Reference numeral 1 designates an input shaft and numeral 2 designates an output shaft, both being in alignment with their axial centers to thereby constitute a steering shaft. A torsion bar 3 is disposed between the input and output shafts. One end of the torsion bar is fitted in a bore 1a formed in the input shaft in its axial direction and fixed by a fixing pin 4, and the other end is forcibly inserted in a bore 2a formed in the output shaft 2 in its axial direction. The other end of the torsion bar may be loosely inserted in the bore 2a and may be fixed by a fixing pin.

Numeral 6 designates a first housing which is supported by a fixed part (not shown) and which in turn supports the input shaft 1 through a bearing 8. Numeral 7 designates a second housing which is connected to the first housing 6 by means of fitting screws 10 and supports the output shaft 2 through a bearing 9.

Numeral 11 designates a slip ring holder made of a resinous material which is firmly connected to the input shaft 1 and is provided with a flange 11a at one end portion thereof. Numeral 12 designates a plurality of slip rings embedded in the holder 11, each of the slip rings having a connecting line 13 extending to the side of the flange 11a.

Numeral 14 designates a printed wiring board in a circular plate form firmly attached to the flange 11a of the holder 11.

Figure 2:
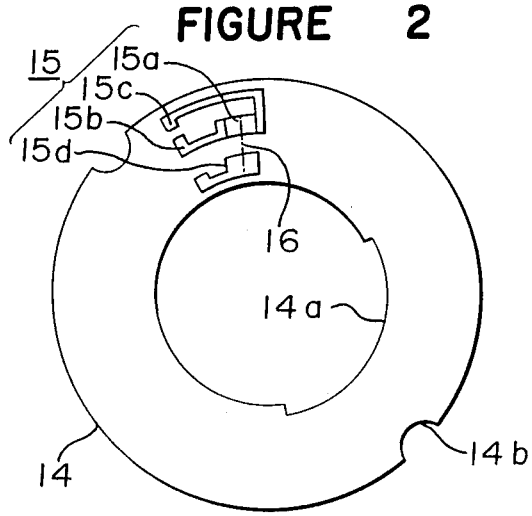
FIG. 2 is a front view of an embodiment of the printed wiring board used in the steering torque detecting device according to the present invention.

FIG. 2 shows the printed wiring board in detail. The printed wiring board is generally in an annular form and is provided with a cut portion 14a at the inner circumferential portion which allows each of the connecting lines 13 to pass therethrough and a pair of cut portions 14b formed at the outer circumferential portions in an opposing relation to allow determination in position of the printed wiring board. On one surface of the printed wiring board 14, there is formed elements 15 for constituting a potentiometer. Namely, numeral 15a designates a resistance layer extending in the circumferential direction of the printed wiring board 14, which has an electrode 15b at one end extended in the circumferential direction and another electrode 15c at the other end which opposes the electrode 15b at a radially outer position. An output electrode 15d is provided opposing the resistance layer 15a at a radially inner position.

The printed wiring board 14 is also provided with an amplifying circuit and a regulation circuit (not shown) for the output electrode 15d.

Referring to FIG. 1, a slider 16 is attached to a surface of a fitting ring 17 made of insulating material which is fitted to the outer periphery of the output shaft 2 and fixed by a fitting screw 18. The slider 16 is so formed as to extend in the radial direction of the printed wiring board 14 so that it electrically contacts with both the resistance layer 15a and the output electrode 15b, it having contacting areas with a small width to contact with them.

Figure 3:
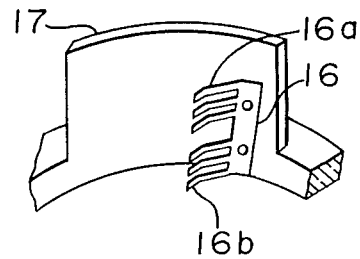
FIG. 3 is a perspective view of an embodiment of the slider used for the steering torque detecting device as shown in FIG. 1.

FIG. 3 shows an embodiment of the slider 16 in detail. The slider 16 is made of a thin metallic plate having flexibility, a low frictional coefficient and good electric conductivity. The slider 16 has a radially extending end portion from which a plurality of thin tongue portions as first contacting pieces 16a extend in the circumferential direction of the printed wiring board so that each end of the contacting pieces 16a is in contact with the resistance layer 15a, and another radially and inwardly extending end portion from which a plurality of thin tongue portions as second contacting pieces 16b extend in the same direction as the first contacting pieces 16a so that each end of the second contacting pieces 16b is in contact with the output electrode 15d.

Turning to FIG. 1, a brush device 19 is formed by a brush holder 20 made of a resinous material and attached to the first housing 6 and a plurality of brushes 21 each made of a thin wire of an alloy having flexibility, a low frictional coefficient and good electric conductivity. Each free end is in slide-contact with each of the slip rings 12 and the rear end is fixed to a terminal block 22 embedded in the brush holder 20. Each of the terminal blocks 22 is connected to drawing wires 24 through each through capacitor 23. The through capacitor 23 is to remove noises resulting in the torque detecting device due to change in the presence of contact between the brushes 14 and the slip rings 12, the change in the contacting pressure causing change in the resistance of contact whereby external noises are easily generated.

Numeral 25 designates a cover for covering the brush holder 20.

Operation of the torque detecting device of the above-mentioned embodiment will now be described.

When a steering wheel is not operated and therefore, no difference exists in the torque between the input and output shafts 1, 2, there is no displacement in the torsion bar 3. Accordingly, the slider 16 is at the neutral position in its circumferential direction with respect to the resistance layer 15a as the element 15 of the potentiometer, whereby no output results from the potentiometer due to a change in displacement of the torsion bar.

When the steering wheel is operated, there produced a difference in torque between the output and input shafts 1, 2, and there appears a displacement due to torsion in the torsion bar 3. As a result, the position of contact of the slider 16 relatively changes in the turning direction with respect to the resistance layer 15a in proportion to the degree of displacement in the torsion bar, whereby an output signal is produced from the potentiometer in proportion to the quantity of displacement. Depending on the direction of turning of the steering wheel to the left or the right, the position of contact of the slider 16 in the circumferential direction of the printed wiring board 14 with respect to the neutral position of the resistance layer 15a is changed on one side or the opposite side. Accordingly, the direction of rotation to be applied to the output shaft 2 is determined depending on a signal detected.

In the above-mentioned embodiment, the slip rings 12 and the printed wiring board 14 are mounted on the input shaft 1, and the slider 16 is mounted on the output shaft 2. However, these parts may be substituted for attachment to the input and output shafts.

Thus, in the above-mentioned embodiment, the printed wiring board provided with the resistance layer and the electrodes which constitute a potentiometer, and the slip rings to transmit signals from the electrodes to the outside are mounted on either one of the input and output shafts, and the slide is mounted on the other one, the slider extending in the radial direction to contact with the resistance layer and the output electrode of the printed wiring board. Accordingly, the entire construction of a signal detecting assembly for the steering torque detecting device can be simple and small-sized.

Figure 4:
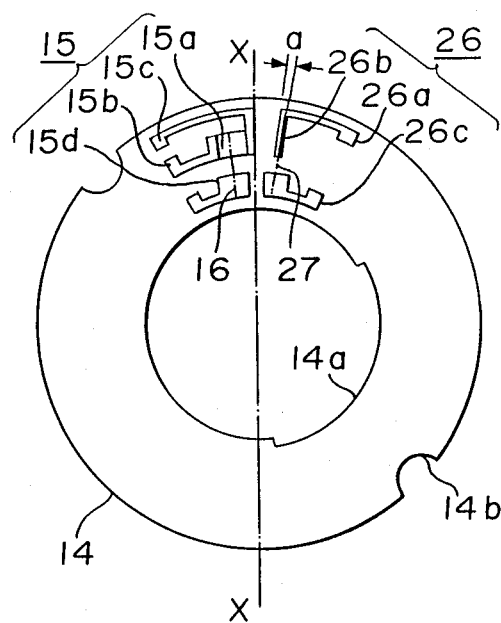
FIG. 4 is a front view of another embodiment of the printed wiring board used in the present invention.
Figure 5:
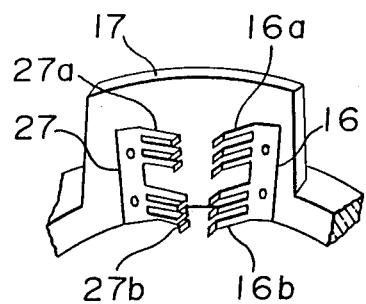
FIG. 5 is a perspective view of an embodiment of the zero point slider as well as the slider used for the present invention.

FIGS. 4 and 5 show another embodiment of the steering torque detecting device according to the present invention. In FIGS. 4 and 5, the same reference numerals as in FIGS. 1–3 designate the same or corresponding parts, and therefore, description of these parts is omitted.

As shown in FIG. 4, a zero point detection unit 26 is formed at a symmetric position to the potentiometer 15 with respect to an X—X line. Namely, the zero point detecting unit 26 is formed in a space remaining unutilized on the surface of the printed wiring board 14. The zero point detecting unit 26 comprises a zero point electrode 26a having a circumferentially extending end, a zero point contact part 26b having a small width extended radially and inwardly on the printed wiring board 14, and a corresponding electrode 26c which is formed at the inner circumferential side to face the zero point contact part 26b with a space. The electrode 26a and the corresponding electrode 26c are respectively connected to the slip rings 12 through the connecting lines 13.

FIG. 5 shows a zero point slider 27 made of the same material as the slider 16 which is formed on the surface of the fitting ring 17 on which the slider 16, as described with reference to FIG. 3 is formed. The zero point slider 27 has a portion in which a plurality of contacting pieces 27a are extended in the circumferential direction of the fitting ring 17 so that each end of the contacting pieces 27a is in contact with the zero point contact part 26b when the fitting ring 17 and the printed wiring board 14 are assembled to the steering torque detecting device. The zero point slider 27 has another portion in which a plurality of contacting pieces 27b are formed to extend in the same direction as the contacting pieces 27a so that each end of the contacting pieces 27b is in contact with the corresponding electrode 26c when the fitting ring 17 and the printed wiring board 14 are assembled.

The position of the zero point slider 27 is so determined so as to be in contact with the zero point contact part 26b only when the difference in the torque between the input and output shafts 1, 2 is zero, namely, when there is no displacement in the torsion bar 3. When a slight difference in torque results so that displacement in rotation at a small rotation angle a is produced, the slider 27 is deviated from the zero point contact part 26b, whereby a zero point detecting signal indicating that there is a torque in the steering wheel is interrupted. Accordingly, the width of the zero point contact part 26b is made as small as possible in order to increase accuracy to detect the zero point. Namely, it is desirable that the zero point contact part 26b should be in a linear form in the radial direction.

In operation of the above-mentioned embodiment, when the steering wheel is not operated, and therefore there is no difference in torque between the input and output shafts 1, 2, any displacement of torsion is produced in the torsion bar 3. Accordingly, the slider 16 is at the neutral (middle) position in the circumferential direction of the printed wiring board with respect to the resistance layer 15a as an element of the potentiometer 15, and there is no output from the potentiometer.

Since the zero point slider 27 extends to contact both the zero point contact part 26b and the corresponding electrode 26c, and a signal indicating that there is conduction between the both elements 26b and 26c is produced and is detected as the torque zero point for the steering wheel, the torque zero point signal prevents the motor from driving the steering wheel.

When the steering wheel is operated to cause a difference in torque between the input and output shafts 1, 2, there is produced a displacement in the torsion bar 3. Then, the position of the slider 16 in contact with the resistance layer 15a is relatively changed by a rotating movement in proportion to a quantity of displacement in the torsion bar, whereby an output signal is generated from the potentiometer in proportion to the quantity of displacement.

By the change in position of the slider 16, the zero point slider 27 becomes out of contact with the zero point contact part 26b due to relative movement in the circumferential direction, whereby an electrically conducting condition between the corresponding electrode 27c and the slider 27 is broken; thus, steering torque is detected. At the same time, the condition of preventing the motor from driving for power steering is released.

Thus, the position of contact of the slider 16 with respect to the neutral position to the resistance layer 15a is changed in the circumferential direction by the operation of the steering wheel either on the left hand or the right hand, whereby the direction of rotation to the output shaft 2 is determined by the change in the value of the detected signal.

The above-mentioned embodiment eliminates a problem that, as seen in an analogical detecting method in the conventional potentiometer, resistance in the resistance layer is not always uniform over its entire area because the ambient temperature changes, this causing zero point drifting resulting in an inconsistency between the zero point in the steering torque and the zero point of the torque detecting device.

Further, in the above-mentioned embodiment, the zero point slider extending in the radial direction to contact the zero point contact part of the zero point electrode and the corresponding electrode is mounted on either the input shaft or the output shaft as well as the slider which spans the resistance layer and the output electrode on the printed wiring board. Accordingly, the entire construction of the torque detecting assembly becomes simple, small-sized and reduces the weight. In addition, correct detection of the zero point in steering torque can be obtained to thereby improve performance of a power steering system.

Figure 6:
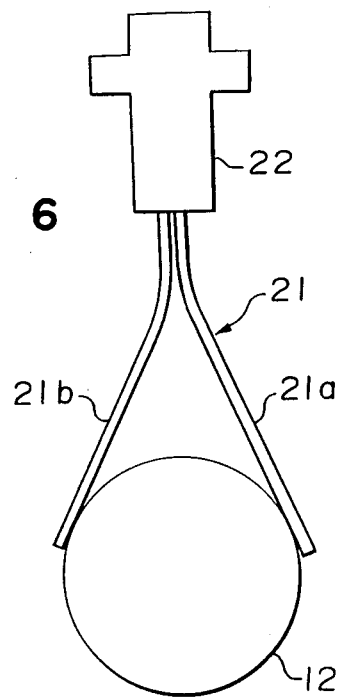
FIG. 6 is a diagram showing an embodiment of a brush used for the present invention.

FIG. 6 is a front view of an embodiment of the brush used for the torque detecting device according to the present invention. Reference numeral 22 designates a terminal block attached to the brush holder 20 as shown in FIG. 1, and numeral 21 designates a brush made of nickel or a nickel series alloy and which is formed by a pair of elongated bodies 21a, 21b. Each end of the elongated bodies 21a, 21b is electrically and mechanically connected to the terminal block 22 and the free ends thereof are in contact with a slip ring so as to hold it therebetween.

The reason why the nickel or the nickel series alloy is used for the brush is to eliminate drawbacks in a conventional flat-plate-like brush made of phosphor bronze which is generally used for steering torque detecting devices, is as follows: (a) it rapidly wears because it contains copper, (b) the manufacturing cost is high, (c) a uniform pressure of contact can not be provided, (d) it has a low durability, and (e) therefore, reliability in its performance is low.

In the brush 21 consisting of two thin elongated bodies 21a, 21b which hold the slip ring 12 rotated with the input shaft 1 therebetween, even when one elongated brush element becomes faulty due to wear, the other bursh element normally operates to detect signals.

The pressure of contact of the brush 21 to the slip ring 12 can be adjusted, for instance, by changing the distance between the terminal block 22 fixing the brush elements 21a, 21b and the slip ring 12.

Obviously, numerous modifications and variations of the present invention are possible in light of the above teachings. It is therefore to be understood that within the scope of the appended claims, the invention may be practiced otherwise than as specifically described herein.

We claim:
1. A steering torque detecting device, comprising:
    a steering shaft consisting of an input shaft and an output shaft,
    a torsion bar provided between said input shaft and said output shaft,
    a torque detecting unit for converting a quantity of torsion produced in said torsion bar into an electric output,
    an electricity collecting unit comprising a slip ring holder connected to said input shaft and having a flange, a plurality of slip rings mounted on said slip ring holders and including a connecting line extending to a side portion of said flange, a potentiometer mounted on said side-portion of said flange of said slip ring holder,
    a plurality of brushes which receive said electric output and supplies electric power from a power source;
    a plurality of bearings for supporting said input and output shafts on the same axial line; and
    a housing supporting said bearings, wherein each of said brushes comprises a pair of elongated bodies made of nickel or a nickel series alloy, a first end of each of which are electrically and mechanically connected to a terminal block of a brush holder and a second end of each including free ends respectively in contact with one of said slip rings.

* * * * *